US010820470B2

(12) United States Patent
Wu et al.

(10) Patent No.: US 10,820,470 B2
(45) Date of Patent: Nov. 3, 2020

(54) HYDRAULIC SYSTEM FOR AN AGRICULTURAL IMPLEMENT INCORPORATING IMPLEMENT-BASED HYDRAULIC LOAD SENSING

(71) Applicant: CNH Industrial America LLC, New Holland, PA (US)

(72) Inventors: Duqiang Wu, Bolingbrook, IL (US); John C. Endsley, Washington, IL (US); Michael Glennon, Normal, IL (US); Kevin D. McKee, Naperville, IL (US)

(73) Assignee: CNH Industrial America LLC, New Holland, PA (US)

( * ) Notice: Subject to any disclaimer, the term of this patent is extended or adjusted under 35 U.S.C. 154(b) by 306 days.

(21) Appl. No.: 16/111,572

(22) Filed: Aug. 24, 2018

(65) Prior Publication Data
US 2020/0060063 A1 Feb. 27, 2020

(51) Int. Cl.
*A01B 63/10* (2006.01)
*A01B 63/32* (2006.01)
(Continued)

(52) U.S. Cl.
CPC ............ *A01B 63/32* (2013.01); *A01B 49/027* (2013.01); *A01B 63/10* (2013.01); *F15B 13/026* (2013.01);
(Continued)

(58) Field of Classification Search
CPC .......... A01B 63/10; A01B 63/22; A01B 63/32
(Continued)

(56) References Cited

U.S. PATENT DOCUMENTS 5,190,111 A 3/1993 Young et al.
5,957,218 A 9/1999 Noonan et al.
(Continued)

FOREIGN PATENT DOCUMENTS

| EP | 1672225 A2 | 6/2006 |
|----|------------|--------|
| EP | 2696080 A1 | 2/2014 |
| WO | WO1995033136 A1 | 12/1995 |

OTHER PUBLICATIONS

CASE iH Troubleshooting Support Information, EHR Override, AFS Troubleshooting, Case Agriculture, Why don't I have a work state arrow? on p. 5, Jun. 11, 2018, 41 pages total. https://www.caseih.com/northamerica/en-us/owners/afs-support/afs-troubleshooting.

(Continued)

*Primary Examiner* — Gary S Hartmann
(74) *Attorney, Agent, or Firm* — Rebecca L. Henkel; Rickard K. DeMille

(57) ABSTRACT

A hydraulic system includes a supply line, at least one implement-based control valve, an implement-based pressure regulating valve, and a load sensing circuit. The implement-based control valve(s) is fluidly coupled to the supply line and configured to regulate a flow of the pressurized hydraulic fluid supplied through at least one downstream actuator line to at least one hydraulic actuator of the implement. The implement-based pressure regulating valve is fluidly coupled to the supply line upstream of the control valve(s) and configured to regulate a fluid pressure to be equal to or greater than a minimum fluid pressure. The load sensing circuit is fluidly coupled to the pressure regulating valve and provides a line or load pressure to the pressure regulating valve. The pressure regulating valve is configured to regulate the supply of the pressurized hydraulic fluid based on the line pressure.

20 Claims, 4 Drawing Sheets

(51) Int. Cl.
*F15B 13/02* (2006.01)
*F15B 13/04* (2006.01)
*A01B 49/02* (2006.01)
*F15B 13/042* (2006.01)

(52) U.S. Cl.
CPC .......... *F15B 13/028* (2013.01); *F15B 13/042* (2013.01); *F15B 13/0417* (2013.01); *F15B 2211/50554* (2013.01)

(58) Field of Classification Search
USPC ...................................................... 172/4, 4.5
See application file for complete search history.

(56) References Cited

U.S. PATENT DOCUMENTS

| | | | |
|---|---|---|---|
| 6,058,342 A | 5/2000 | Orbach et al. | |
| 6,112,839 A | 9/2000 | Ostler et al. | |
| 7,269,947 B2 * | 9/2007 | Yoshino | F15B 11/006 60/469 |
| 7,721,813 B2 * | 5/2010 | Hou | A01B 63/112 172/7 |
| 9,801,331 B2 | 10/2017 | Foster et al. | |
| 10,550,868 B2 * | 2/2020 | Vigholm | F15B 21/14 |
| 2016/0205862 A1 | 7/2016 | Sudbrink et al. | |
| 2017/0010619 A1 | 1/2017 | Foster et al. | |
| 2017/0357400 A1 | 12/2017 | Foster et al. | |
| 2019/0297774 A1 * | 10/2019 | Hamilton | A01C 5/068 |

OTHER PUBLICATIONS

Kovacev et. al., Impact of Electronic-Hydraulic Hitch Control on Rational Exploitation of Tractor in Ploughing, Semantic Scholar, May 10, 2008, pp. 287-294. https://pdfs.sematicscholar.org/86a3/3d32df7a5f0666cfd0805e8f744038fbb98e.pdf.

* cited by examiner

HYDRAULIC SYSTEM FOR AN AGRICULTURAL IMPLEMENT INCORPORATING IMPLEMENT-BASED HYDRAULIC LOAD SENSING

FIELD

The present subject matter relates generally to hydraulic systems for agricultural implements and, more particularly, a hydraulic system for an agricultural implement that utilizes implement-based hydraulic load sensing to facilitate regulation of the supply of hydraulic fluid to the implement.

BACKGROUND OF THE INVENTION

Certain agricultural implements include ground engaging tools configured to interact with the soil. For example, a tillage implement may include tillage points and/or disc blades configured to break up the soil for subsequent planting or seeding operations. Tillage implements typically include one or more actuators (e.g., hydraulic cylinders) configured to control a penetration depth of the ground engaging tools into the soil. The actuator(s) may also move the ground engaging tools between a lowered/ground engaging position and a raised/transport portion (e.g., to facilitate repositioning the tillage implement between successive rows). The actuator(s) are typically controlled by an electronic control system having one or more electrically operated valves configured to control fluid flow (e.g., hydraulic fluid flow) to the actuator(s).

Typically, hydraulic fluid is supplied to an agricultural implement via a pump located on the work vehicle that is towing the implement. In this regard, the work vehicle typically includes an electronic control system configured to control the operation of the pump. However, in some instances, work vehicles may not include any load sensing capability that allows the vehicle-based control system to determine the downstream pressure requirements to the implement and, thus, adjust the operation of the pump. Additionally, other work vehicles may include a fixed displacement pump. As such, to ensure desired functionality, the pumps associated with these vehicles are often configured to constantly supply a maximum source pressure that is typically significantly higher than the pressure necessary to operate the implement's actuator(s) within an anticipated range of loads, thereby reducing the efficiency of the hydraulic system. Further, the maximum source pressure provided by the pump may put undesirable stress and strain on valves positioned on the agricultural implement and/or the actuator(s).

Accordingly, a hydraulic system for an agricultural implement that provides improved control of the supply of hydraulic fluid to the implement to address one or more of the issues identified above would be welcomed in the art.

SUMMARY OF THE INVENTION

Aspects and advantages will be set forth in part in the following description, or may be obvious from the description, or may be learned through practice of the invention.

In one aspect, the present subject matter is directed to a hydraulic system for regulating the pressure of hydraulic fluid supplied to actuators of an agricultural implement. The hydraulic system includes a supply line configured to receive pressurized hydraulic fluid from a fluid source, at least one implement-based control valve, an implement-based pressure regulating valve, and a load sensing circuit. The at least one implement-based control valve is fluidly coupled to the supply line and configured to regulate a flow of the pressurized hydraulic fluid received from the supply line and supplied through at least one downstream actuator line to at least one hydraulic actuator of the implement. The implement-based pressure regulating valve is fluidly coupled to the supply line upstream of the at least one control valve and configured to regulate a fluid pressure of the pressurized hydraulic fluid supplied to the at least one control valve through the supply line such that the fluid pressure is equal to or greater than a minimum fluid pressure. The load sensing circuit is fluidly coupled to the pressure regulating valve. Further, the load sensing circuit provides a line pressure associated with the at least one downstream actuator line to the pressure regulating valve when the at least one implement-based control valve is supplying pressurized hydraulic fluid through the at least one downstream actuator line to the at least one hydraulic actuator. Further, when the line pressure associated with the at least one downstream actuator line is greater than the minimum fluid pressure, the pressure regulating valve is configured to regulate the supply of the pressurized hydraulic fluid to the at least one control valve such that the fluid pressure is equal to a pressure associated with the line pressure.

In another aspect, the present subject matter is directed to an agricultural implement including a frame, a plurality of ground-engaging tools supported by the frame, at least one hydraulic actuator supported by the frame, a supply line configured to receive pressurized hydraulic fluid, at least one control valve fluidly coupled to the supply line, a pressure regulating valve fluidly coupled to the supply line upstream of the at least one control valve, and a load sensing circuit. The at least one hydraulic actuator is supported by the frame and configured to raise and lower at least one of the ground-engaging tools relative to a soil surface. The at least one control valve is configured to regulate a flow of the pressurized hydraulic fluid received from the supply line and supplied through at least one downstream actuator line to the at least one hydraulic actuator. The pressure regulating valve is configured to regulate a fluid pressure of the pressurized hydraulic fluid supplied to the at least one control valve through the supply line such that the fluid pressure is equal to or greater than a minimum fluid pressure. The load sensing circuit is fluidly coupled to the pressure regulating valve. As such, the load sensing circuit provides a line pressure associated with the at least one downstream actuator line to the pressure regulating valve when the at least one implement-based control valve is supplying pressurized hydraulic fluid through the at least one downstream actuator line to the at least one hydraulic actuator. Further, when the line pressure associated with the at least one downstream actuator line is greater than the minimum fluid pressure, the pressure regulating valve is configured to regulate the supply of the pressurized hydraulic fluid to the at least one control valve such that the fluid pressure is equal to a pressure associated with the line pressure.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended FIGS., in which.

Figure 1:
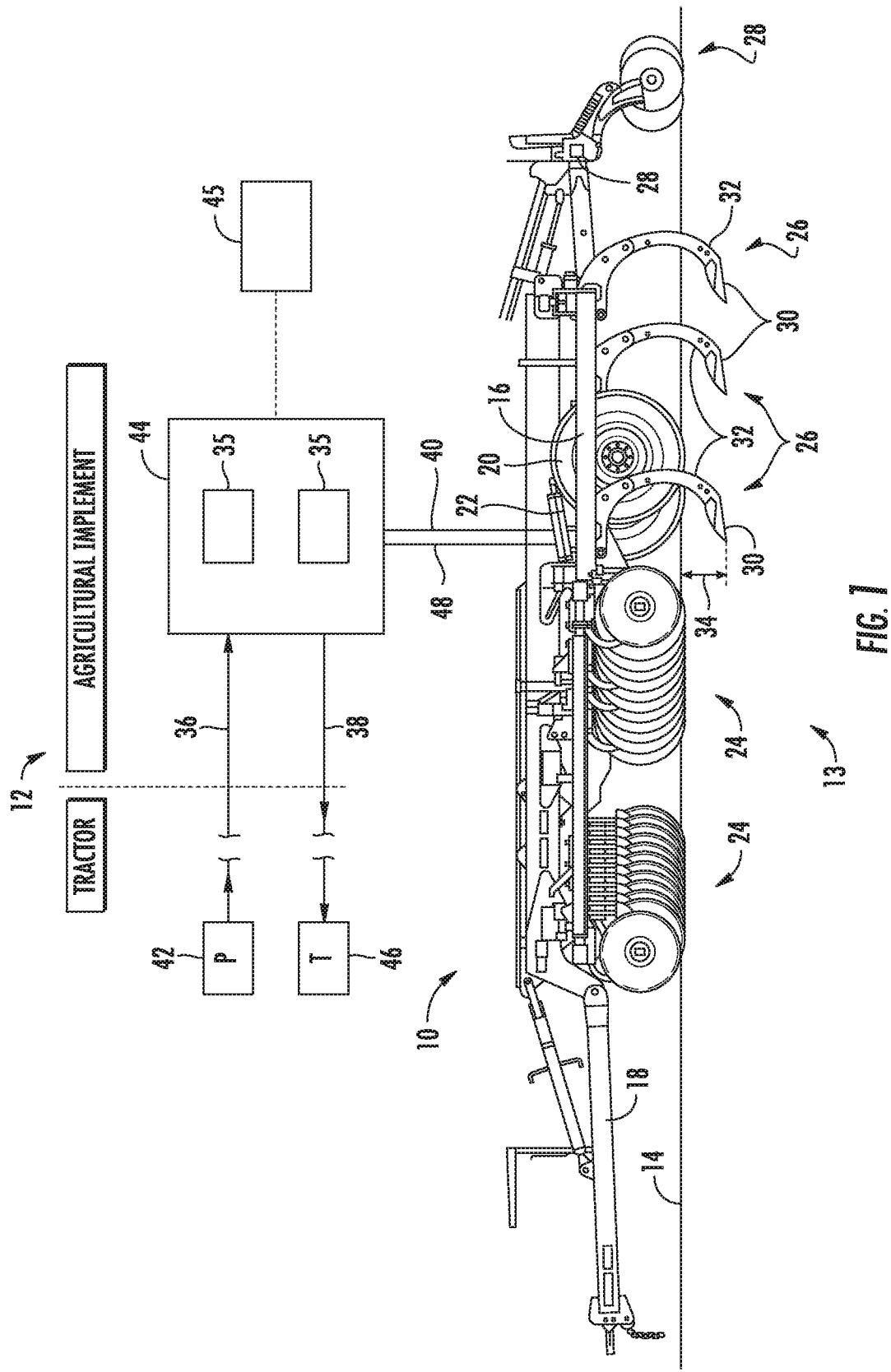
FIG. 1 illustrates a side view of one embodiment of an agricultural implement having a hydraulic system in accordance with aspects of the present subject matter.

Repeat use of reference characters in the present specification and drawings is intended to represent the same or analogous features or elements of the present invention.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to hydraulic systems for agricultural implements utilizing implement-based hydraulic load sensing to facilitate regulation of the supply of hydraulic fluid to the implement. Specifically, in several embodiments, a supply line provides pressurized hydraulic fluid from a fluid source to an implement-based control valve that regulates a flow of the pressurized hydraulic fluid to one or more hydraulic actuators. An implement-based pressure regulating valve may be fluidly coupled to the supply line between the fluid source and the implement-based control valve. In such embodiments, the pressure regulating valve may adjust a fluid pressure of the pressurized hydraulic fluid supplied to the implement-based control valve. For example, the pressure regulating valve may control the fluid pressure such that the fluid pressure is greater than or equal to a minimum fluid pressure. In such embodiments, a load sensing circuit may be fluidly coupled to the pressure regulating valve and provide a line pressure of one or more downstream actuator lines to the pressure regulating valve, such as when the one or more downstream actuator lines are supplying pressurized hydraulic fluid from the control valve to the hydraulic actuator(s). For example, the load sensing circuit may fluidly couple the pressure regulating valve and the one or more downstream actuator lines. In accordance with aspects of the present subject matter, the pressure regulating valve may adjust the fluid pressure to be equal to a pressure associated with the line pressure. In one embodiment, the pressure regulating valve may adjust the fluid pressure supplied to the control valve to an actual load pressure required by the hydraulic actuators and represented by the line pressure.

In one embodiment, the load sensing circuit may include a plurality of shuttle valves each fluidly coupled in series to an associated actuator line of separate hydraulic actuators. In such embodiments, the series of shuttle valves may communicate a maximum pressure of the actuator lines. For example, the maximum pressure may be the pressure of the hydraulic actuator under the greatest hydraulic load. As such, the pressure regulating valve may adapt the pressure supplied to the control valve to satisfy the load requirement of the hydraulic actuator to which the maximum hydraulic load is being applied.

Turning to the drawings, FIG. 1 illustrates a side view of one embodiment of an agricultural implement 10 having a hydraulic system 12. In the illustrated embodiment, the agricultural implement 10 may be a tillage implement having multiple ground engaging tools 13 configured to till soil 14. As illustrated, the agricultural implement 10 may include a frame 16 and a hitch assembly 18 coupled to the frame 16. The hitch assembly 18 may be configured to couple to a work vehicle (e.g., a tractor), and the work vehicle may be configured to tow the agricultural implement 10 through a field. In the illustrated embodiment, the agricultural implement 10 may include wheels 20 configured to engage the surface of the soil 14 and to support at least a portion of the agricultural implement 10.

In addition, the agricultural implement 10 may include one or more actuators (e.g., cylinder), such as hydraulic actuators 22, supported by the frame 16. The hydraulic actuator 22 may be configured to raise and lower at least one of the ground-engaging tools 13 relative to a soil surface. In one particular embodiment, the hydraulic actuator 22 may be configured to raise and lower the ground-engaging tools 13 relative to the soil surface by raising or lowering at least a portion of the frame 16. For instance, the hydraulic actuator 22 may be configured to move the wheels 20 from the illustrated raised position to a lowered position. While the wheels 20 are in the illustrated raised position, ground engaging tools of the agricultural implement 10 engage the soil 14. As the agricultural implement 10 is towed through the field, the ground engaging tools 13 break up the soil for subsequent planting or seeding operations. The hydraulic actuator 22 may lower the wheels 20 from the illustrated raised position to the lowered position. As a result, the ground engaging tools are disengaged from the soil 14 to facilitate transport of the agricultural implement 10 (e.g., between successive rows of the field).

In the illustrated embodiment, the ground engaging tools 13 may include disc blades 24, tillage point assemblies 26, and leveling discs 28. The disc blades 24 may be configured to engage a top layer of the soil 14. As the agricultural implement 10 is towed through the field, the disc blades 24 may be driven to rotate, thereby breaking up the top layer and sizing residue on the surface of the field. In the illustrated embodiment, the disc blades 24 are arranged in two rows. However, in alternative embodiments, the disc blades 24 may be arranged in more or fewer rows (e.g., 1, 2, 3, 4, 5, 6, or more). In addition, the angle of each row may be selected to control the interaction of the disc blades 24 with the top layer of the soil 14. The tillage point assemblies 26 may be configured to engage the soil 14 at a greater depth, thereby breaking up a lower layer of the soil 14. In the illustrated embodiment, each tillage point assembly 26 may include a tillage point 30 and a shank 32. The shank 32 may be configured to position the tillage point 30 at a target depth 34 beneath the soil surface, and the tillage point 30 may be configured to break up the soil 14. The shape of each tillage point 30, the arrangement of the tillage point assemblies 26, and the number of tillage point assemblies 26 may be selected to control tillage within the field. Furthermore, as the agricultural implement 10 is towed through the field, the leveling discs 28 are driven to rotate, thereby sizing soil clods, leveling the soil surface, smoothing the soil surface, and/or cutting residue on the soil surface.

Furthermore, the hydraulic system 12 may include a supply line 36 and a valve assembly 44 supported or otherwise installed on the implement 10, with the valve assembly 44 being fluidly coupled to the supply line 36. In general, the valve assembly 44 may include one or more implement-based control valves 35 configured to regulate the pressure of hydraulic fluid supplied to the corresponding hydraulic actuators 22 of the agricultural implement 10. As shown in FIG. 1, the supply line 36 may be configured to receive pressurized hydraulic fluid from a fluid source 42. In one embodiment, the fluid source 42 may include a pump P (e.g., hydraulic pump) disposed on the work vehicle. The hydraulic system 12 may also include a return line 38 configured to output fluid to a reservoir 46. For example, the reservoir 46 may include a tank T (e.g., hydraulic fluid tank) disposed on the work vehicle. The pump P may be fluidly coupled to the tank T, thereby circulating hydraulic fluid through the hydraulic system 12. In one particular embodiment, the fluid source 42 may be a fixed displacement pump P.

In several embodiments, each implement-based control valve 35 may be configured to regulate a flow of the pressurized hydraulic fluid received from the supply line 36 and supplied through one or more downstream actuator lines 40, 48 to a corresponding hydraulic actuator(s) 22 of the agricultural implement 10. More particularly, the control valve 35 may, in several embodiments, be configured to utilize the fluid flow from the supply line 36 to cause the hydraulic actuator(s) 22 to raise the ground engaging tools 13 relative to the soil surface and to utilize fluid flow from the supply line 36 to cause the hydraulic actuator 22 to lower the ground engaging tools 13 relative to the soil surface while the implement is being operated within an automatic control mode in which the operation of the hydraulic actuator(s) 22 is automatically controlled.

As shown in FIG. 1, the hydraulic system 12 may also include an implement-based controller 45 communicatively coupled to the valve assembly 44 to allow the controller 45 to manipulate or control the operation of the associated control valve(s) 35. For instance, when operating in the automatic control mode, the controller 45 may be configured to automatically control the operation of one or more of the control valve(s) 35 to adjust the actuation/retraction of the associated actuator(s) 22 based on, for example, a position of the ground engaging tools 13 relative to the soil surface.

While a single hydraulic actuator 22 may be controlled by the hydraulic system 12 in the illustrated embodiment, in other embodiments, the agricultural implement 10 may include more hydraulic actuators 22 controlled by the hydraulic system 12. For example, in certain embodiments, the position of each ground engaging tool 13 may be controlled by a respective hydraulic actuator 22, or the position of each group of ground engaging tools 13 (e.g., the disc blades 24, the tillage point assemblies 26, the leveling discs 28, etc.) may be controlled by a respective hydraulic actuator 22. In such embodiments, the hydraulic system 12 may control the hydraulic actuators 22 individually, together, or in groups. Furthermore, while the illustrated agricultural implement 10 includes disc blades 24, tillage point assemblies 26, and leveling discs 28, in other embodiments, the agricultural implement 10 may include other and/or additional ground engaging tools 13 (e.g., finishing reels configured to size clods and/or smooth the field surface, etc.). In addition, while the hydraulic system 12 described herein is used to control the position of ground engaging tools 13 of a tillage implement, in other embodiments, the hydraulic system 12 may be utilized to control the position of ground engaging tools 13 of other suitable implements (e.g., a planting implement, a seeding implement, a harvesting implement, etc.).

It should be recognized that the agricultural implement of FIG. 1 is provided for exemplary purposes only to place the present subject matter in an exemplary field of use. Thus, one of ordinary skill in the art should readily appreciate that the present subject matter may generally be used with agricultural implements having any other suitable implement configuration. Further, in other embodiments, the agricultural implement 10 may be any other suitable implement (e.g., any suitable non-tillage implement) where at least one hydraulic actuator receives pressurized hydraulic fluid from a fluid source on the work vehicle.

Figure 2:
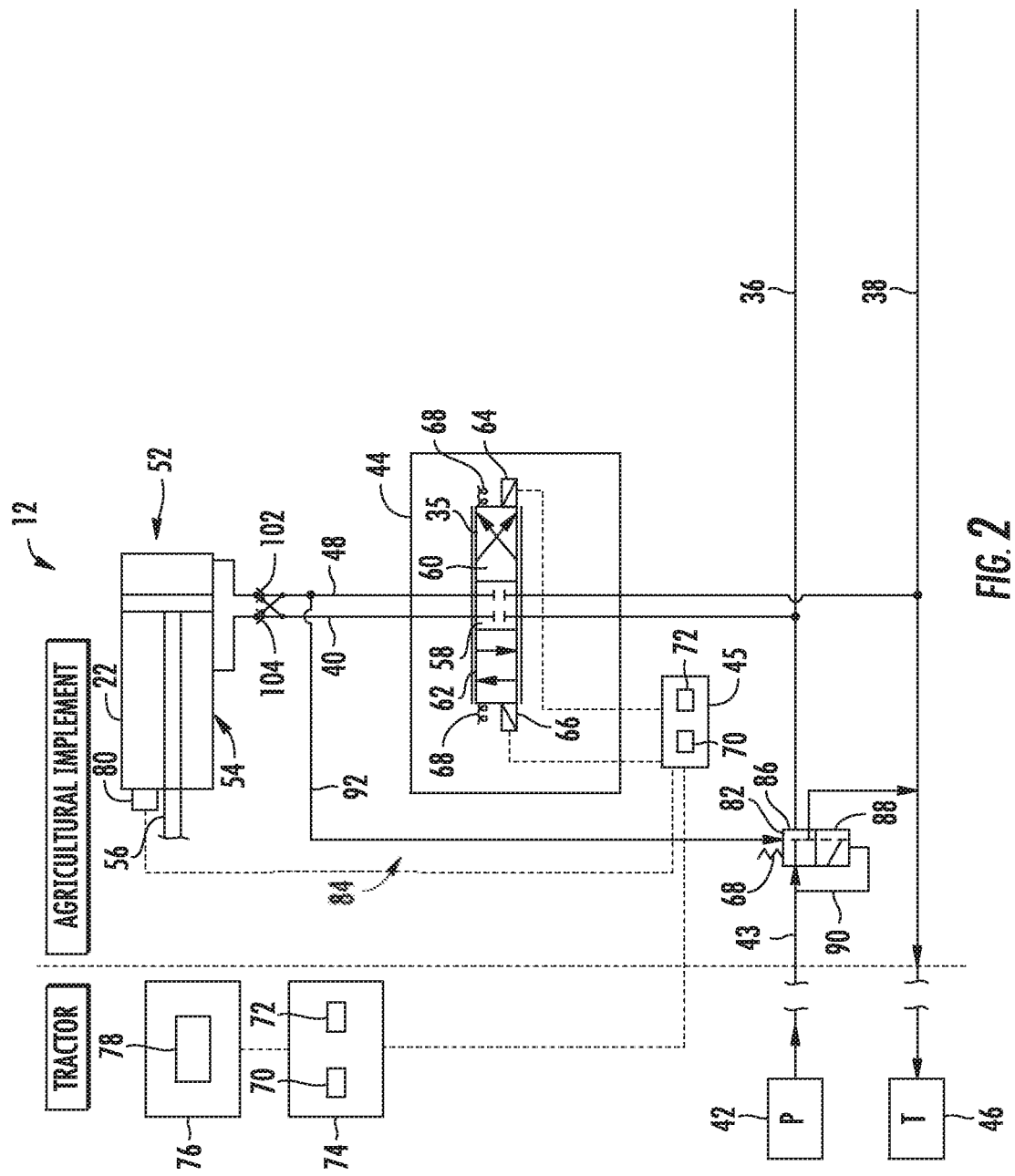
FIG. 2 illustrates a schematic diagram of one embodiment of a hydraulic system that may be employed with an agricultural implement, such as the agricultural implement of FIG. 1, in accordance with aspects of the present subject matter.

Referring now to FIG. 2, a schematic diagram of a particular embodiment of a hydraulic system that may be employed with an agricultural implement is illustrated in accordance with aspects of the present subject matter. For purposes of this description, the embodiment of the system shown in FIG. 2 will generally be described with reference to the agricultural implement 10 and the associated hydraulic system 12 of FIG. 1. However, it should be appreciated that, in other embodiments, the disclosed system may be utilized with implements having any other suitable implement configuration and/or within systems having any other suitable system configurations.

As discussed above with reference to FIG. 1, the hydraulic system 12 may include supply and return lines 36, 38 fluidly coupled to a corresponding pressure source 42 and reservoir 46, respectively (e.g., a pump P and associated fluid tank T of the work vehicle configured to tow the implement 10). Additionally, the hydraulic system 12 may include one or more control valves 35 of an implement-based valve assembly 44 configured to regulate the supply of hydraulic fluid to one or more associated hydraulic actuators 22.

As shown in the illustrated embodiment, one or more actuator lines may be provided to fluidly couple the control valve 35 to the associated hydraulic actuator 22, thereby allowing pressurized hydraulic fluid to be transferred between the control valve 35 and the hydraulic actuator 22. Specifically, a first actuator line 40 may be fluidly coupled to a rod end 54 (e.g., a first end) of the hydraulic actuator 22 and a second actuator line 48 may be fluidly coupled to a cap end 52 (e.g., a second end) of the hydraulic actuator 22. Providing fluid to the cap end 52 of the hydraulic actuator 22 may drive a piston rod 56 to extend, and providing fluid to the rod end 54 of the hydraulic actuator 22 may drive the piston rod 56 to retract. In the illustrated embodiment, extension of the piston rod 56 drives the ground engaging tools 13 of the agricultural implement 10 upwardly relative to the soil surface (e.g., by driving the wheels 20 of the agricultural implement 10 downwardly relative to the frame 16), and retraction of the piston rod 56 drives the ground engaging tools 13 of the agricultural implement 10 downwardly relative to the soil surface (e.g., by driving the wheels 20 of the agricultural implement 10 upwardly relative to the frame 16). However, in other embodiments, extension of the piston rod 56 may drive the ground engaging tools 13 downwardly relative to the soil surface, and retraction of the piston rod 56 may drive the ground engaging tools 13 upwardly relative to the soil surface. In such embodiments, the second actuator line 48 may be fluidly coupled to the rod end (e.g., the first end) of the hydraulic actuator 22, and the first actuator line 40 may be coupled to the cap end (e.g., the second end) of the hydraulic actuator or vice versa. Furthermore, in certain embodiments, multiple hydraulic actuators 22 may be utilized to control the position of the ground engaging tools 13 relative to the soil surface. In such embodiments, the hydraulic actuators 22 may be fluidly coupled to one another in a series arrangement, in a parallel arrangement, in another suitable arrangement, or a combination thereof.

In the illustrated embodiment, the control valve 35 corresponds to proportional three position/four way valve. In such an embodiment, the control valve 35 may include a neutral or first position 58 corresponding to a closed position at which fluid flow between the supply/return lines 36, 38 and the first and second actuator lines 48, 48 is blocked or cut-off. A second position 60 of the control valve 35 may be configured to facilitate fluid flow between the supply line 36 and the cap end 52 of the hydraulic actuator 22 (e.g., via the second actuator line 48) and between the return line 38 and the rod end 54 of the hydraulic actuator 22 (e.g., via the first actuator line 40) to drive the hydraulic actuator 22 to raise the ground engaging tools 13 relative to the soil surface. A third position 62 of the control valve 35 may be configured to facilitate fluid flow between the supply line 36 and the rod end 54 of the hydraulic actuator 22 and between the return line 38 and the cap end 52 of the hydraulic actuator 22 to drive the hydraulic actuator 22 to lower the ground engaging tools 13 relative to the soil surface. In the illustrated embodiment, the control valve 35 is a proportional control valve configured to control the fluid flow rate through the control valve 35 (e.g., based on the position of the valve relative to the first position 58). However, in other embodiments, the control valve 35 may be any other suitable type of valve configured to control fluid flow between the supply and return lines 36, 38 and the hydraulic actuator 22.

In the illustrated embodiment, the control valve 35 may include a raise actuator 64 configured to drive the control valve 35 to the second position 60. Further, the control valve 35 may include a lower actuator 66 configured to drive the control valve 35 to the third position 62. In the illustrated embodiment, the raise actuator 64 and the lower actuator 66 are electric actuators (e.g., solenoid actuators) configured to move the control valve 35 in response to receiving an electric signal. In addition, the control valve 35 may include biasing elements 68 (e.g., springs) configured to urge the control valve 35 toward the first position 58. Accordingly, applying an electric current to the raise actuator 64 drives the control valve 35 to the second position 60, thereby causing the hydraulic actuator 22 to raise the ground engaging tools 13 relative to the soil surface. Furthermore, applying an electric current to the lower actuator 66 drives the control valve 35 to the third position 62, thereby causing the hydraulic actuator 22 to lower the ground engaging tools 13 relative to the soil surface. Furthermore, if no electric current is applied to either actuator 64, 66, the biasing elements 68 may drive the control valve 35 to the first position 58, thereby blocking fluid flow between the supply and return lines 36, 38 and the hydraulic actuator 22.

In the illustrated embodiment, the implement-based controller 45 may be communicatively coupled to the control valve(s) 35. Specifically, as shown in FIG. 2, the controller 45 may be communicatively coupled to the raise actuator 64 and/or to the lower actuator 66. In such an embodiment, the controller 45 may be configured to control the operation of the control valve 35 based on the position of the ground engaging tools 13 relative to the soil surface.

In certain embodiments, the controller 45 may be an electronic controller having electrical circuitry configured to process data from a source (e.g., the vehicle controller 74 as described below) and to output instructions to the control valve 35. For example, the controller 45 may communicate an electric current to the raise actuator 64 and/or the lower actuator 66. In the illustrated embodiment, the controller 45 includes a processor 70, such as a microprocessor, and a memory device 72. The controller 45 may also include one or more storage devices and/or other suitable components. The processor 70 may be used to execute software, such as software for controlling the operation of the control valve 35, and so forth. Moreover, the processor 70 may include multiple microprocessors, one or more "general-purpose" microprocessors, one or more special-purpose microprocessors, and/or one or more application specific integrated circuits (ASICS), or some combination thereof. For example, the processor 70 may include one or more reduced instruction set (RISC) processors.

The memory device 72 may include a volatile memory, such as random access memory (RAM), and/or a nonvolatile memory, such as read-only memory (ROM). The memory device 72 may store a variety of information and may be used for various purposes. For example, the memory device 72 may store processor-executable instructions (e.g., firmware or software) for the processor 70 to execute, such as instructions for controlling the control valve 35, and so forth. The storage device(s) (e.g., nonvolatile storage) may include ROM, flash memory, a hard drive, or any other suitable optical, magnetic, or solid-state storage medium, or a combination thereof. The storage device(s) may store data (e.g., threshold values, etc.), instructions (e.g., software or firmware for controlling the valve assembly 44, etc.), and any other suitable data.

In certain embodiments, the controller 45 may be communicatively coupled to a vehicle controller 74 positioned on the work vehicle. For example, the vehicle controller 74 may communicate data indicative of a desired target depth 34 (FIG. 1) and/or desired height of the ground engaging tool(s) 13. Further, in the automatic control mode, the controller 45 may receive the data indicative of, e.g., the desired target depth 34 and communicate with the control valve 35 to extend and/or retract the hydraulic actuator(s) 22 as described above. Further, it should be recognized that the vehicle controller 74 may be configured generally the same as or similar to the implement-based controller 45. For example, the vehicle controller 74 may include one or more processors 70, a memory device 72, and/or storage devices as described above with reference to the controller 45.

Still referring to FIG. 2, in the illustrated embodiment, a user interface 76 may be configured to provide input to the vehicle controller 74 and to receive output from the vehicle controller 74. As illustrated, the user interface 76 may include a display 78. The display 78 may be configured to present information to an operator, such as a numeric and/or graphical representation of the position of the ground engaging tools 13 relative to the soil surface. In certain embodiments, the display 78 may be a touch screen display configured to receive input from the operator. The user interface 76 may also include other input devices (e.g., keyboard, mouse, switches, buttons, etc.) configured to receive input from the operator.

As indicated above, the controller 45 may be configured to control the operation of the control valve(s) 35 while the hydraulic system 12 is in the automatic control mode. For example, an operator may input a target position of the ground engaging tools relative to the soil surface into the user interface 76, and the operator may engage the automatic control mode via the user interface 76. The user interface 76, in turn, may output signal(s) to the vehicle controller 74 indicative of the target position and activation of the automatic control mode. Such output signal(s) may then be communicated to the implement-based controller 45. The implement-based controller 45 may then output instructions to the control valve 35 to raise or lower the ground engaging tools based on the current position of the ground engaging tools 13 (e.g., which may be determined based on feedback from a position sensor 80) and the target position of the ground engaging tools 13. In certain embodiments, the implement-based controller 45 and/or the vehicle controller 74 may be configured to automatically determine the target position of the ground engaging tools 13 relative to the soil surface (e.g., based on the type of implement, the type(s) of ground engaging tool 13, the type of soil 14, the type of crops to be planted after tillage operations, soil conditions, etc.).

If the current position of the ground engaging tools 13 is lower than the target position, the implement-based controller 45 may instruct the control valve(s) 35 to raise the ground engaging tools 13. For example, the controller 45 may instruct the raise actuator 64 to drive the control valve(s) 35 toward the second position 60. As a result, fluid may flow from the supply line 36 to the cap end 52 of the hydraulic actuator 22, which causes the hydraulic actuator 22 to raise the ground engaging tools 13 relative to the soil surface. Because the control valve(s) 35 may be a proportional control valve in the illustrated embodiment, the controller 45 may control the fluid flow rate from the control valve(s) 35 to the cap end 52 of the hydraulic actuator 22, which may control the rate at which the hydraulic actuator 22 raises the ground engaging tools 13 relative to the soil surface.

If the current position of the ground engaging tools 13 is higher than the target position, the implement-based controller 45 may instruct the control valve(s) 35 to lower the ground engaging tools 13. For example, the controller 45 may instruct the lower actuator 66 to drive the control valve(s) 35 toward the third position 62. As a result, fluid may flow from the supply line 36 to the rod end 54 of the actuator hydraulic actuator 22, which causes the hydraulic actuator 22 to lower the ground engaging tools 13 relative to the soil surface. Because the control valve(s) 35 may be a proportional control valve, the controller 45 may control the fluid flow rate from the control valve(s) 35 to the rod end 54 of the hydraulic actuator 22, which may control the rate at which the hydraulic actuator 22 lowers the ground engaging tools relative to the soil surface.

Still referring to FIG. 2, the hydraulic system 12 may further include an implement-based pressure regulating valve 82 and an associated load sensing circuit 84. As shown in FIG. 2, the pressure regulating valve 82 may be fluidly coupled to the supply line 36 upstream of the valve assembly 44 and the associated control valve 35. In general, the pressure regulating valve 82 may be configured to regulate the fluid pressure of the pressurized hydraulic fluid supplied to the valve assembly 44, or more particularly, the pressure of an upstream portion 43 of the supply line 36 extending between the fluid source 42 and the pressure regulating valve 82 (hereinafter "the source pressure"). By regulating the source pressure, the pressure regulating valve 82 may also be configured to regulate the fluid pressure supplied within the portion of the supply line 36 extending between the pressure regulating valve 82 and the valve assembly 44 (hereinafter "the system pressure"). For example, the pressure regulating valve 82 may regulate the pressure of the hydraulic fluid such that the source pressure and, thus, the system pressure is equal to or greater than a minimum fluid pressure set for the hydraulic system 12. During operation of the system, the system pressure may be approximately equal to the source pressure or slightly less than the source pressure. For instance, when the control valve 35 is at its first or closed position 58, the system pressure may be approximately the same as the source pressure. When the control valve 35 is actuated toward one of its opened positions (e.g., the second position 60 or third position 62), thereby allowing for the flow of the hydraulic fluid through the valve 35, the system pressure may be slightly less than the source pressure (e.g., the pressure may be reduced through the pressure regulating valve 82 due to loses and/or inefficiencies).

In certain embodiments, the pressure regulating valve 82 may be a proportional two position/three way valve. For example, a first position 86 of the pressure regulating valve 82 may correspond to a fully opened position to facilitate fluid flow between the supply line 36 and the valve assembly 44 at the system pressure of the hydraulic fluid supplied through the supply line 36. As such, when in the first position 86, the pressure regulating valve 82 may provide a flow of hydraulic fluid at the system pressure to the valve assembly 44 for subsequent delivery to the hydraulic actuator 22 (e.g., via control of the associated control valve 35). Additionally, the pressure regulating valve 82 may include a neutral or second position 88 corresponding to a partially closed position at which a portion of the fluid flow to the valve assembly 44 is diverted to the return line 38 (i.e., without flowing to the valve assembly 44). For instance, in one embodiment, when at the second position 88, the pressure regulating valve 82 may be configured to supply pressurized hydraulic fluid to the valve assembly 44 at the minimum fluid pressure set for the hydraulic system 12. As indicated above, the pressure regulating valve 82 corresponds to a proportional valve. As such, the pressure regulating valve 82 may be moved to any suitable intermediate position between the first and second positions 86, 88, thereby allowing the valve 82 to regulate the pressure of the fluid supplied to the valve assembly 44. Specifically, in one embodiment, the pressure regulating valve 82 may be configured to regulate the fluid pressure between a maximum source pressure available from the fluid source 42 and the minimum system pressure based on the current position of the valve between the first and second positions 86, 88. For instance, as the position of the pressure regulating valve 82 varies, the source pressure may be increased/decreased to a given pressure between the maximum and minimum pressures, which similarly increases/decreases the system pressure. Specifically, by restricting the amount of fluid diverted to the return line 38, the source pressure may be increased, thereby increasing the downstream system pressure. Similarly, by increasing the amount of fluid diverted to the return line 38, the source pressure may be decreased, thereby reducing the downstream system pressure.

Further, as shown in FIG. 2, a pilot line 90 may be fluidly coupled between the upstream portion 43 of the supply line 36 and the pressure regulating valve 82. As such, the pilot line 90 may be configured to urge the pressure regulating valve 82 toward the second position 88. Additionally, a biasing element 68 may be provided on the opposite side of the pressure regulating valve 82 that is configured to urge the pressure regulating valve 82 toward the first position 86. In one embodiment, the biasing force provided by the biasing element 68 may be configured such that the pressure regulating valve 82 allows for pressurized hydraulic fluid to flow through the pressure regulating valve 82 to the valve assembly 44 at the minimum system pressure. In certain embodiments, the pressure regulating valve 82 may be configured such that the minimum fluid pressure is approximately 30 bar or less, such as 25 bar or less, or, more particularly, approximately 20 bar or less or approximately 15 bar or less. However, in other embodiments, the pressure regulating valve 82 may be any other suitable type of valve configured to regulate the fluid flow within the system 12.

As shown in FIG. 2, the load sensing circuit 84 may be fluidly coupled to the pressure regulating valve 82 to provide a line pressure associated with one or more of the downstream actuator lines 40, 48. For instance, the load sensing circuit 84 may be fluidly coupled between at least one of the downstream actuator lines 40, 48 and the pressure regulating valve 82. In the illustrated embodiment, the load sensing circuit 84 includes a load sensing line 92 fluidly coupled to the pressure regulating valve 82 between the second actuator line 48 and the pressure regulating valve 82. In general, the load sensing circuit 84 may provide a line pressure (hereinafter "the load pressure") associated with the downstream actuator line 48 to the pressure regulating valve 82, which may be indicative of the hydraulic load on the actuator 22. For example, the load sensing line 92 may be coupled to the pressure regulating valve 82 as a pilot line to actuate the pressure regulating valve 82 such that the source pressure is approximately equal to a pressure associated with the load pressure, such as a pressure approximately equal to the load pressure plus the minimum system pressure provided by the biasing element 68 (to the extent that such pressure does not exceed the maximum source pressure achievable from the fluid source 42). In certain embodiments, it should be recognized that the maximum source pressure may be limited by a safety relief valve positioned on the work vehicle or may be limited by the capabilities of the fluid source 42. For instance, as shown in FIG. 2, the load sensing line 92 may be fluidly coupled to the pressure regulating valve 82 on the same side of the valve 82 as the biasing element 68. As such, the load sensing circuit 84 may be configured to urge the pressure regulating valve 82 toward the first position 86. It should be recognized that, in the embodiment depicted, the load sensing circuit 84 and the biasing element 68 may work together to urge the pressure regulating valve 82 toward the first position 86. Thus, even when the load pressure within the load sensing line 92 is less than or equal to the minimum fluid pressure set for the system 12 (including a line pressure of approximately zero), the biasing element 68 may be configured to apply a great enough biasing force to ensure at least the minimum system pressure set for the hydraulic system 12 is communicated to the valve assembly 44.

When the load pressure within the load sensing line 92 is greater than zero (thereby indicating a hydraulic load on the actuator 22), the biasing element 68 and the load sensing circuit 84 may drive the pressure regulating valve 82 towards the first position 86 so that hydraulic fluid is supplied to the valve assembly 44 at a system pressure that is greater than the minimum system pressure. For example, as indicated above, in one embodiment, the source pressure may be approximately equal to the summation of the minimum system pressure provided by the biasing element 68 and the load pressure within the load sensing line 92.

In one embodiment, the pressure regulating valve 82 may be configured to regulate the supply of the pressurized hydraulic fluid to the valve assembly 44 (and, thus, the control valve 35) such that the system pressure is at least equal to the load pressure, such as the load pressure plus a given margin. For instance, when the load pressure is greater than zero but less than the maximum source pressure, the pressure regulating valve 82 may be configured such that it supplies hydraulic fluid to the valve assembly 44 at a system pressure that is within a given pressure range of the load pressure within the load sensing line 92, such as a fluid pressure that ranges from the load pressure to a pressure greater than the line pressure by a predetermined percentage or margin (e.g., 5% or the minimum system pressure set by the biasing element 68). Additionally, when the summation of the minimum system pressure and the load pressure is equal to or greater than the maximum source pressure, the pressure regulating valve 82 may be configured such that it supplies hydraulic fluid to the valve assembly 44 at a system pressure that is equal to the maximum source pressure or slightly less than the maximum source pressure.

As indicated above, the system pressure from the pressure regulating valve 82 may generally be greater than the minimum system pressure set for the hydraulic system 12. Further, the pressure regulating valve 82 may be configured to divert a portion of pressurized hydraulic fluid to the return line 38 when the load pressure within the load sensing line 92 is less than the maximum source pressure or when the load pressure plus the minimum system pressure is less than the maximum source pressure. In certain embodiments, the maximum source pressure may be approximately 200 bar or more, such as 210 bar or more, or, more particularly, approximately 230 bar or more.

Additionally, as indicated above, the load pressure within the load sensing line 92 may be greater than zero, such as when the hydraulic actuator 22 is under a load that increases the pressure within the associated actuator line(s) 40, 48. For instance, such a situation may arise when the hydraulic actuator 22 is utilized to either raise or lower the ground engaging tool(s) 13. The resulting increased pressure within the actuator line(s) 40, 48 may then be communicated to the pressure regulating valve 82 as the load pressure via the load sensing circuit 84, with the increased pressure driving the pressure regulating valve 82 toward the first position 86 and allowing an increased volume of hydraulic fluid to pass through pressure regulating valve 82 (as opposed to being diverted to the return line 38). As such, the system pressure supplied to the valve assembly 44 may be increased to a pressure associated with the pressure within the actuator line(s) 40, 48 (e.g., the load pressure). In such a manner, the pressure regulating valve 82 may be configured to regulate the source pressure and, thus, the system pressure between the maximum source pressure and the minimum system pressure based on the current line pressure of the actuator line(s) 40, 48 to which the load sensing circuit 84 is coupled.

Referring still to FIG. 2, the system 12 may, in one embodiment, include one or more first check valves 102 fluidly coupled to the second actuator line 48 between the load sensing line 92 and the hydraulic actuator 22. The first check valve(s) 102 may be configured to selectively allow the pressurized hydraulic fluid to flow to the hydraulic actuator 22 when line pressure within the actuator line 48 is above a minimum actuator pressure. For example, certain hydraulic actuators 22 and/or associated ground engaging tools 13 may require a minimum actuator pressure in order to function properly. The first check valve(s) 102 may allow the pressurized hydraulic fluid to flow to the hydraulic actuator 22 only when the line pressure within the actuator line 48 is above this minimum actuator pressure.

As further illustrated in FIG. 2, the first actuator line 40 may include a second check valve 104 fluidly coupled between the control valve 35 and the hydraulic actuator 22. In several embodiments, the check valves 102, 104 coupled to the first and second actuator lines 40, 48 may be provided in a double pilot-operated check valve arrangement. In such an arrangement, a pilot line may extend from the first actuator line 40 to the first check valve 102. Similarly, a pilot line may extend from the second actuator line 48 to the second check valve 104. Such an arrangement may allow the check valves 102, 104 to selectively allow pressurized hydraulic fluid to flow to the hydraulic actuator 22 when the line pressure within one of the actuator lines 40, 48 is above a minimum actuator pressure while also allowing the hydraulic fluid to flow back to the control valve 35 via the other of the actuator lines 40, 48. For example, when the control valve 35 is actuated toward the second position 60, the line pressure in the second actuator line 48 may rise above the minimum actuator pressure, opening the check valve 102 and allowing hydraulic fluid to flow to the cap end 52. Further, the fluid pressure in the second actuator line 48 may be communicated to the second check valve 104 through the pilot line to open the second check valve 104. As such, hydraulic fluid may flow from the rod end 54, through the first actuator line 40, and subsequently to the control valve 35 for flow to the return line 38.

Similarly, when the control valve 35 is actuated toward the third position 62, the line pressure in the first actuator line 40 may rise above the minimum actuator pressure, opening the second check valve 104 and allowing hydraulic fluid to flow to the rod end 54. Further, the fluid pressure in the first actuator line 40 may be communicated to the check valve 102 through the pilot line to open the check valve 102. As such, hydraulic fluid may flow from the cap end 52, through the second actuator line 48, and subsequently to the control valve 35 for flow to the return line 38.

By providing such a check valve arrangement, the load pressure within the load sensing circuit 84 may be very low (approximately zero) when the control valve 35 is at its neutral position 58, thereby allowing the source pressure to be regulated based on the minimum system pressure set by the biasing spring 68. When the control valve(s) 35 is subsequently actuated to its second or third position 60, 62, the pressure regulating valve 82 may increase the system pressure, as described above, until the line pressure within the associated actuator line 40, 48 has surpassed the minimum actuator pressure. As such, the pressurized hydraulic fluid may flow to the hydraulic actuator 22. It should further be appreciated that each hydraulic actuator 22 and/or ground engaging tool 13 may include a separate check valve arrangement. Further, different configurations of the hydraulic actuator(s) 22 and ground engaging tool(s) 13 may require distinct minimum actuator pressures. In one embodiment, the minimum actuator pressure may be approximately 135 bar or more, such approximately 137.5 bar, or approximately 140 bar or more.

Figure 3:
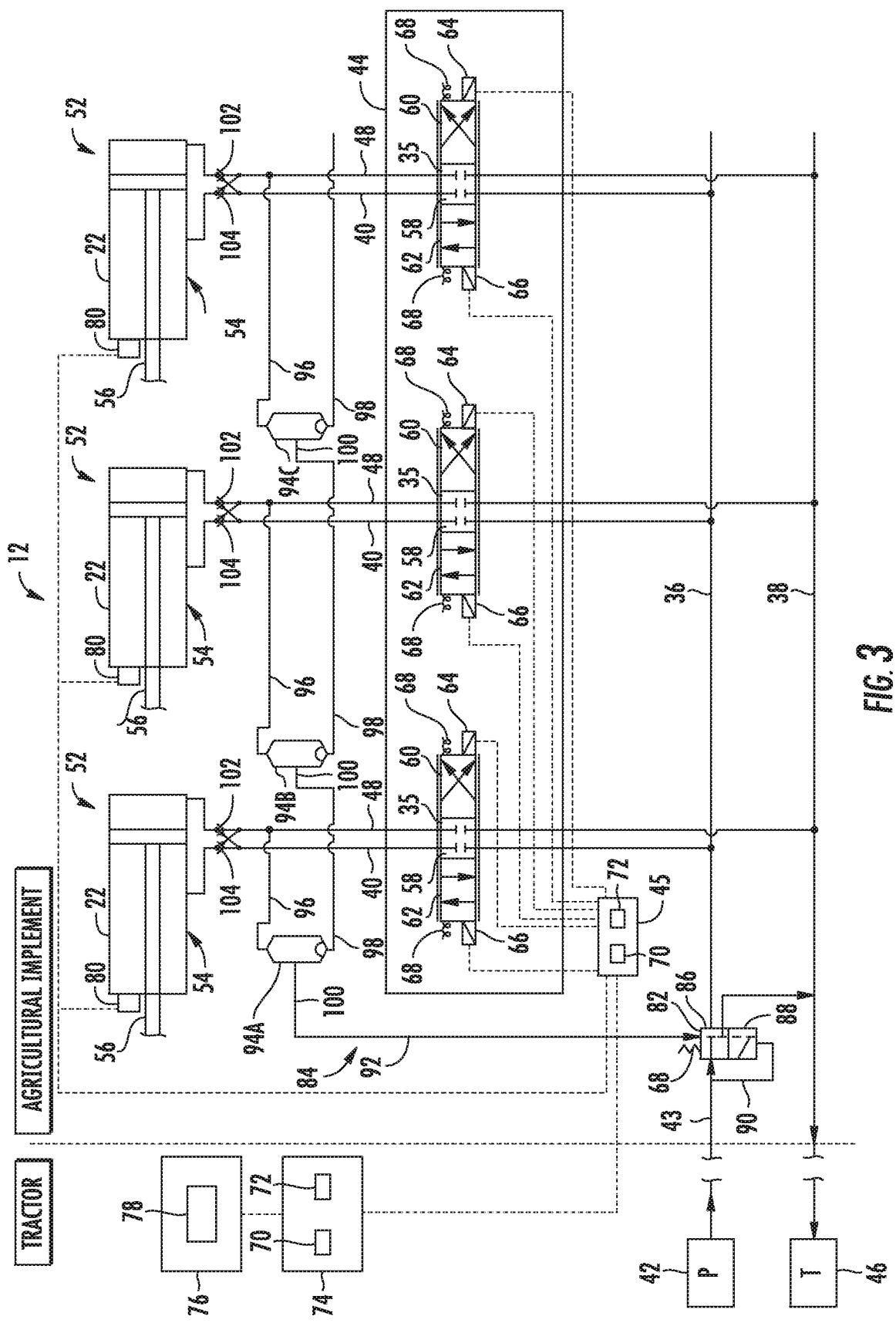
FIG. 3 illustrates a schematic diagram of another embodiment of a hydraulic system that may be employed with an agricultural implement, such as the agricultural implement of FIG. 1, in accordance with aspects of the present subject matter.

Referring now to FIG. 3, a schematic diagram of another embodiment of a hydraulic system that may be employed with an agricultural implement is illustrated in accordance with aspects of the present subject matter. For purposes of this description, the embodiment of the system shown in FIG. 3 will generally be described with reference to the agricultural implement 10 and the associated hydraulic system 12 of FIG. 1. However, it should be appreciated that, in other embodiments, the disclosed system may be utilized with implements having any other suitable implement configuration and/or within systems having any other suitable system configurations.

As shown, FIG. 3 illustrates the hydraulic system 12 configured to operate with an agricultural implement 10 including a plurality of hydraulic actuators 22. For instance, each of the plurality of hydraulic actuators 22 may be configured to raise or lower a separate ground engaging tool 13. Or, in other embodiments, two or more hydraulic actuators 22 may be configured to raise or lower at least one of the ground engaging tools 13.

In general, the hydraulic system 12 of FIG. 3 may be configured the same as or similar to the hydraulic system of FIG. 2. For example, the hydraulic system 12 may include the supply line 36, the pressure regulating valve 82 fluidly coupled to the supply line 36, and the load sensing circuit 84. However, as shown in FIG. 3, unlike the single control valve 35 described above, the valve assembly 44 includes a plurality of control valves 35, such as one control valve 35 for each separate hydraulic actuator 22 shown in the illustrated embodiment. Still, in other embodiments, one control valve 35 may manipulate and/or control the operation of the several hydraulic actuators 22, such as all of the hydraulic actuators 22. Also, it should be recognized that the controller 45 may, in several embodiments, be configured to control the operation of each of the control valves 35 individually to allow for independent control of the associated actuators 22.

In the illustrated embodiment, separate pairs of actuator lines 40, 48 are provided that fluidly couple each hydraulic actuator 22 to its respective control valve 35 of the valve assembly 44. As such, each control valve 35 may be configured to regulate the flow of pressurized hydraulic fluid supplied to its respective actuator 22 via the associated actuator lines 40, 48. Further, the system 12 may include one or more check valves 102 associated with each hydraulic actuator 22. Each check valve(s) 102 may include the same minimum actuator pressure or include distinct minimum actuator pressures for different configurations of the hydraulic actuator(s) 22 and the ground engaging tool(s) 13. Further, in another embodiment, one check valve(s) 102 may be fluidly coupled between the valve assembly 44 and multiple hydraulic actuator(s) 22. It should also be recognized that, for each hydraulic actuator 22, the system may include a check valve 102 and a second check valve 104 in a double pilot-operated check valve arrangement to allow the hydraulic fluid to return from the hydraulic actuator 22 to the check valve 35.

Moreover, as shown in FIG. 3, in addition to the load sensing line 92 described above with reference to FIG. 2, the load sensing circuit 84 includes a plurality of shuttle valves 94 (e.g., a first shuttle valve 94A, a second shuttle valve 94B, and a third shuttle valve 94C) fluidly coupled in series to the load sensing line 92. Specifically, the load sensing circuit 82 includes a shuttle valve 94 fluidly coupled to one of the actuator lines 40, 48 associated with each actuator 22. For instance, as shown in FIG. 3, each shuttle valve 94 may include a first input port 96 fluidly coupled to one of the actuator lines 40, 48 associated with the corresponding actuator 22. Additionally, each shuttle valve 94 may include a second input port 98 that is fluidly coupled to the output port of a further upstream shuttle valve 94. In one embodiment, the second input port 98 of the most upstream shuttle valve 94 (e.g., third shuttle valve 94C) may not be coupled to any fluid line. Additionally, each shuttle valve may include an output port 100. As shown in the illustrated embodiment, the output port 100 for the furthest downstream shuttle valve 94 of the load sensing circuit 84 (e.g., the first valve 94A) may be coupled directly to the load sensing line 92 fluidly coupled to the pressure-regulating valve 82.

In operation, each shuttle valve 94 may be configured to output fluid at a pressure equal to the maximum pressure of the fluid supplied to its respective input ports 96, 98. As such, by coupling the shuttle valves 94 in series in the manner shown in FIG. 3, the load pressure provided through the load sensing line 92 will generally correspond to the maximum pressure associated with the respective actuator lines 40, 48 for the hydraulic actuators 22. In other words, the load pressure within the load sensing line 92 will generally correspond to the maximum hydraulic load of the various hydraulic actuators 22 (e.g., will correspond to the hydraulic load on the hydraulic actuator 22 that represents the maximum load within the system 12).

The load pressure communicated via the load sensing circuit 84 to the pressure-regulating valve 82 may generally cause the pressure-regulating valve 82 to function as described above with reference to FIG. 2. For example, when the load pressure within the load sensing line 92 exceeds the minimum system pressure, the pressure regulating valve 82 may be configured to provide pressurized fluid to the valve assembly 44 at a fluid pressure associated with the load pressure as represented by the maximum pressure supplied from the shuttle valves 94. For instance, as indicated above, the pressure regulating valve 82 may be configured to provide pressurized fluid to the valve assembly 44 at a pressure equal to the summation of the load pressure and the minimum system pressure set by the biasing spring 68.

Figure 4:
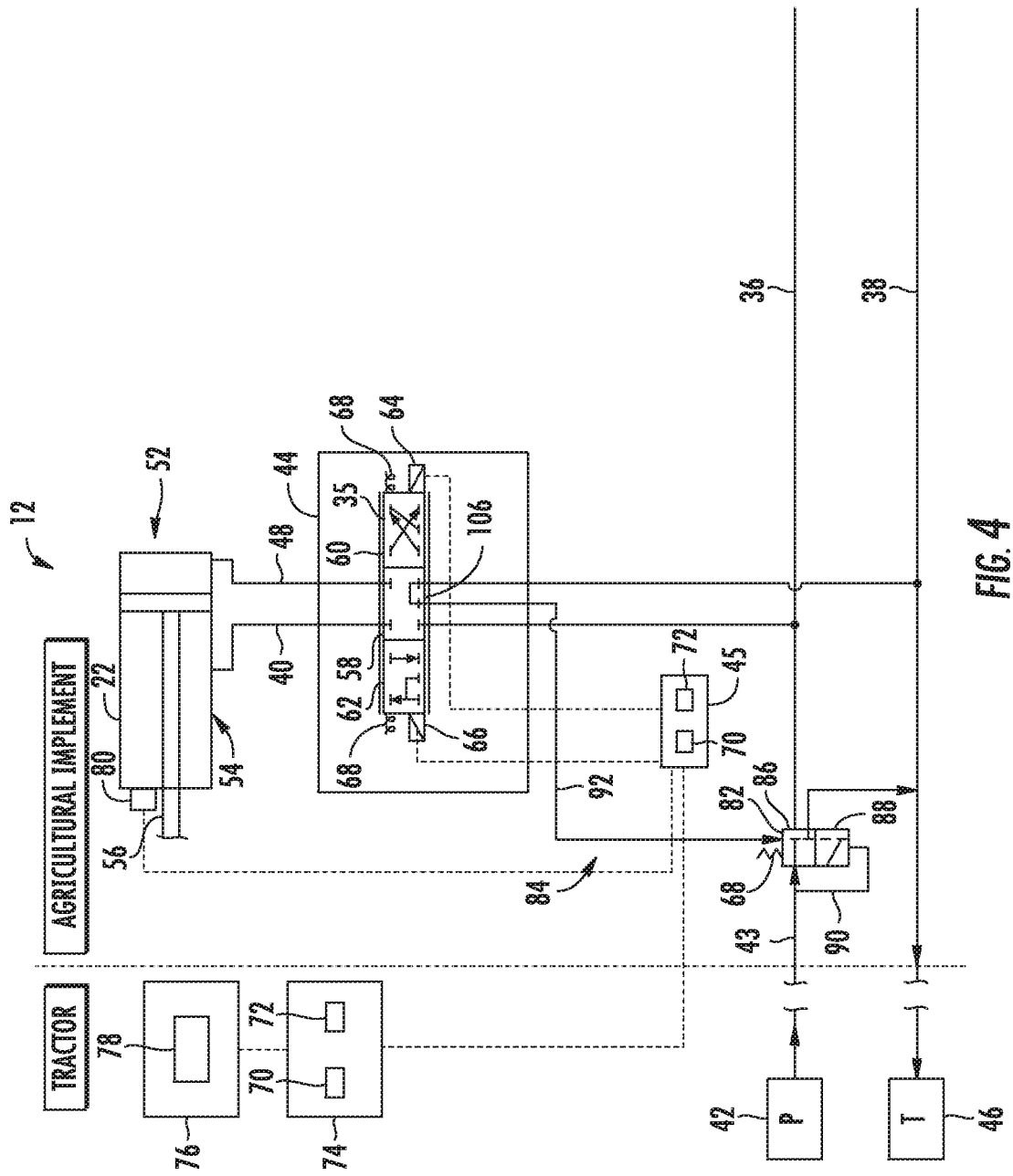
FIG. 4 illustrates a schematic diagram of a further embodiment of a hydraulic system that may be employed with an agricultural implement, such as the agricultural implement of FIG. 1, in accordance with aspects of the present subject matter.

Referring now to FIG. 4, a schematic diagram of a further embodiment of a hydraulic system that may be employed with an agricultural implement is illustrated in accordance with aspects of the present subject matter. For purposes of this description, the embodiment of the system shown in FIG. 4 will generally be described with reference to the agricultural implement 10 and the associated hydraulic system 12 of FIG. 1. However, it should be appreciated that, in other embodiments, the disclosed system may be utilized with implements having any other suitable implement configuration and/or within systems having any other suitable system configurations.

As shown, FIG. 4 illustrates the hydraulic system 12 configured to operate with an agricultural implement 10 including one or more of hydraulic actuators 22. Though one hydraulic actuator 22 and control valve 35 is illustrated in FIG. 4, in other embodiments, two or more hydraulic actuators 22 and/or control valves 35 may be configured to raise or lower at least one of the ground engaging tools 13.

In general, the hydraulic system 12 of FIG. 4 may be configured the same as or similar to the hydraulic system of FIG. 2. For example, the hydraulic system 12 may include the supply line 36, the pressure regulating valve 82 fluidly coupled to the supply line 36, and the load sensing circuit 84 fluidly coupled to the pressure regulating valve 82. However, as shown in FIG. 4, unlike the load sensing line 92 described above that was fluidly coupled to one of the actuator lines downstream of the control valve 35, the load sensing circuit 84 of the illustrated hydraulic system 12 includes a load sensing line 92 fluidly coupled to a portion of the control valve 35. More particularly, as shown in the illustrated embodiment, the load sensing line 92 is fluidly coupled to a load sense port 106 of the control valve 35.

With such an arrangement, as shown in FIG. 4, when the control valve 35 is in its first or neutral position 58, the load sensing port 106 may be fluidly coupled to the return line 38. As such, the load sensing circuit 84 may communicate a line or load pressure of approximately zero to the pressure regulating valve 82. In such instance, by communicating a line pressure of approximately zero, the pressure regulating valve 82 may be configured to regulate the source pressure and, thus, the system pressure of the hydraulic fluid supplied to the control valve 35 to the minimum system pressure set by the biasing element 68.

As further shown in the illustrated embodiment, when the control valve 35 is actuated toward its second position 60, the pressurized hydraulic fluid flows from the supply line 36 to the second downstream actuator line 48. In such a configuration, the load sensing port 106 may be fluidly coupled to the second downstream actuator line 48 and, thus, may be configured to communicate the load in the second downstream actuator line 48 to the pressure regulating valve 82 as the load pressure. Further, as shown in FIG. 4, when the control 35 is actuated toward its third position 62, the pressurized hydraulic fluid flows from the supply line 36 to the first downstream actuator line 40. In such a configuration, the load sensing port 106 may be fluidly coupled to the first downstream actuator line 40 and, thus, may be configured to communicate the load in the first downstream actuator line 40 to the pressure regulating valve 82 as the load pressure.

Accordingly, with the illustrated configuration shown in FIG. 4, when the control valve 35 is supplying pressurized hydraulic fluid through at least one of the downstream actuator lines 40, 48 (i.e., when the control valve 35 is actuated away from its neutral position 58 toward the second or third position 60, 62), the load sensing circuit 84 may provide a load pressure to the pressure regulating valve 82 associated with the line pressure within the actuator line 40, 48 receiving pressure hydraulic fluid from the supply line 36. Further, when the control valve 35 is not supplying the pressurized hydraulic fluid to at least one of the downstream actuator lines 40, 48 (i.e., when the control valve is disposed at its first or neutral position 58), the load sensing circuit may provide a line pressure to the pressure regulating valve 82 corresponding to the pressure of the return line 38 (e.g., a de-minimis or zero pressure).

The load pressure communicated via the load sensing circuit 84 to the pressure-regulating valve 82 may generally cause the pressure-regulating valve 82 to function as described above with reference to FIG. 2. For example, when the load pressure within the load sensing line 92 is greater than zero, the pressure regulating valve 82 may be configured to provide pressurized fluid to the valve assembly 44 at a fluid pressure associated with the load pressure. For instance, as indicated above, the pressure regulating valve 82 may be configured to provide pressurized fluid to the valve assembly 44 at a pressure equal to the summation of the load pressure and the minimum system pressure set by the biasing spring 68.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A hydraulic system for regulating the pressure of hydraulic fluid supplied to actuators of an agricultural implement, the hydraulic system comprising:
a supply line configured to receive pressurized hydraulic fluid from a fluid source;
at least one implement-based control valve fluidly coupled to the supply line, the at least one control valve configured to regulate a flow of the pressurized hydraulic fluid received from the supply line and supplied through at least one downstream actuator line to at least one hydraulic actuator of the implement;
an implement-based pressure regulating valve fluidly coupled to the supply line upstream of the at least one control valve, the pressure regulating valve being configured to regulate a fluid pressure of the pressurized hydraulic fluid supplied to the at least one control valve through the supply line such that the fluid pressure is equal to or greater than a minimum fluid pressure; and
a load sensing circuit fluidly coupled to the pressure regulating valve, the load sensing circuit providing a line pressure associated with the at least one downstream actuator line to the pressure regulating valve when the at least one control valve is supplying the pressurized hydraulic fluid through the at least one downstream actuator line to the at least one hydraulic actuator,
wherein, when the line pressure associated with the at least one downstream actuator line is greater than the minimum fluid pressure, the pressure regulating valve is configured to regulate the supply of the pressurized hydraulic fluid to the at least one control valve such that the fluid pressure is equal to a pressure associated with the line pressure.

2. The hydraulic system of claim 1, wherein, when the line pressure associated with the at least one downstream actuator line is equal to zero, the pressure regulating valve is configured to regulate the supply of the pressurized hydraulic fluid to the at least one control valve such that the fluid pressure is equal to the minimum fluid pressure.

3. The hydraulic system of claim 1, wherein the supply line is configured to receive pressurized hydraulic fluid from the fluid source up to a maximum source pressure greater than the minimum fluid pressure, the pressure regulating valve being configured to divert a portion of the pressurized hydraulic fluid to a return line when the line pressure associated with the at least one downstream actuator line is less than the maximum source pressure.

4. The hydraulic system of claim 3, wherein the pressure regulating valve is configured to regulate the fluid pressure between the maximum source pressure and the minimum fluid pressure based on the line pressure associated with the at least one downstream actuator line.

5. The hydraulic system of claim 1, wherein the load sensing circuit comprises a load sensing line fluidly coupled to the pressure regulating valve, the load sensing line being coupled to the pressure regulating valve as a pilot line to actuate the pressure regulating valve such that the fluid pressure is equal to a pressure associated with the line pressure.

6. The hydraulic system of claim 5, wherein the at least one downstream actuator line comprises a plurality of downstream actuator lines and the at least one hydraulic actuator comprises a plurality of hydraulic actuators, each downstream actuator line being fluidly coupled to a respective hydraulic actuator of the plurality of hydraulic actuators.

7. The hydraulic system of claim 6, wherein the load sensing circuit further comprises a plurality of shuttle valves fluidly coupled in series to the load sensing line, each shuttle valve including an input port fluidly coupled to a respective downstream actuator line of the plurality of downstream actuator lines such that the line pressure provided through the load sensing line corresponds to a maximum pressure associated with the plurality of downstream actuator lines.

8. The hydraulic system of claim 6, wherein the at least one control valve comprises a plurality of control valves, each control valve being configured to regulate the flow of the pressurized hydraulic fluid supplied through a respective downstream actuator line of the plurality of downstream actuator lines.

9. The hydraulic system of claim 1, wherein the fluid source is a fixed displacement pump.

10. An agricultural implement, comprising:
a frame;
a plurality of ground-engaging tools supported by the frame;
at least one hydraulic actuator supported by the frame, the at least one hydraulic actuator being configured to raise and lower at least one of the ground-engaging tools relative to a soil surface;
a supply line configured to receive pressurized hydraulic fluid;
at least one control valve fluidly coupled to the supply line, the at least one control valve configured to regulate a flow of the pressurized hydraulic fluid received from the supply line and supplied through at least one downstream actuator line to the at least one hydraulic actuator;
a pressure regulating valve fluidly coupled to the supply line upstream of the at least one control valve, the pressure regulating valve being configured to regulate a fluid pressure of the pressurized hydraulic fluid supplied to the at least one control valve through the supply line such that the fluid pressure is equal to or greater than a minimum fluid pressure; and
a load sensing circuit fluidly coupled to the pressure regulating valve, the load sensing circuit providing a line pressure associated with the at least one downstream actuator line to the pressure regulating valve when the at least one control valve is supplying the pressurized hydraulic fluid through the at least one downstream actuator line to the at least one hydraulic actuator,
wherein, when the line pressure associated with the at least one downstream actuator line is greater than the minimum fluid pressure, the pressure regulating valve is configured to regulate the supply of the pressurized hydraulic fluid to the at least one control valve such that the fluid pressure is equal to a pressure associated with the line pressure.

11. The implement of claim 10, wherein, when the line pressure associated with the at least one downstream actuator line is equal to zero, the pressure regulating valve is configured to regulate the supply of the pressurized hydraulic fluid to the at least one control valve such that the fluid pressure is equal to the minimum fluid pressure.

12. The implement of claim 10, wherein the supply line is configured to receive pressurized hydraulic fluid up to a maximum source pressure greater than the minimum fluid pressure, the pressure regulating valve being configured to divert a portion of the pressurized hydraulic fluid to a return line when the line pressure associated with the at least one downstream actuator line is less than the maximum source pressure.

13. The implement of claim 12, wherein the pressure regulating valve is configured to regulate the fluid pressure between the maximum source pressure and the minimum fluid pressure based on the line pressure associated with the at least one downstream actuator line.

14. The implement of claim 10, wherein the load sensing circuit comprises a load sensing line fluidly coupled to the pressure regulating valve, the load sensing line being coupled to the pressure regulating valve as a pilot line to actuate the pressure regulating valve such that the fluid pressure is equal to a pressure associated with the line pressure.

15. The implement of claim 14, wherein the at least one downstream actuator line comprises a plurality of downstream actuator lines, and the at least one hydraulic actuator comprises a plurality of hydraulic actuators, each downstream actuator line being fluidly coupled to a respective hydraulic actuator of the plurality of hydraulic actuators.

16. The implement of claim 15, wherein the load sensing circuit further comprises a plurality of shuttle valves fluidly coupled in series to the load sensing line, each shuttle valve including an input port fluidly coupled to a respective downstream actuator line of the plurality of downstream actuator lines such that the line pressure provided through the load sensing line corresponds to a maximum pressure associated with the plurality of downstream actuator lines.

17. The implement of claim 15, wherein the at least one control valve comprises a plurality of control valves, each control valve being configured to regulate the flow of the pressurized hydraulic fluid supplied through a respective downstream actuator line of the plurality of downstream actuator lines.

18. The implement of claim 10, wherein the at least one hydraulic actuator is configured to raise and lower the at least one of the ground-engaging tools relative to the soil surface by raising or lowering at least a portion of the frame.

19. The implement of claim 10, wherein the implement comprises a tillage implement.

20. The implement of claim 19, wherein the ground-engaging tools comprise at least one of disc blades, tillage point assemblies, or leveling discs.

* * * * *